United States Patent
Berenschot

(10) Patent No.: US 6,253,420 B1
(45) Date of Patent: Jul. 3, 2001

(54) CLAMPING ASSEMBLY

(75) Inventor: Johan W. Berenschot, Winterswijk (NL)

(73) Assignee: Ericsson Radio Systems B.V., Emmen (NL)

( * ) Notice: Subject to any disclaimer, the term of this patent is extended or adjusted under 35 U.S.C. 154(b) by 0 days.

(21) Appl. No.: 09/506,452

(22) Filed: Feb. 18, 2000

Related U.S. Application Data

(63) Continuation of application No. PCT/NL98/00423, filed on Jul. 23, 1998.

(30) Foreign Application Priority Data

Aug. 20, 1997 (NL) .................................................. 1006799

(51) Int. Cl.[7] ................................ A45F 5/02; F16D 1/00; H05K 7/00
(52) U.S. Cl. ............................... 24/3.11; 24/3.1; 24/3.12; 24/597; 24/633
(58) Field of Search .................... 24/3.11, 3.12, 24/3.1, 3.2, 13, 597, 633

(56) References Cited

U.S. PATENT DOCUMENTS

| | | | |
|---|---|---|---|
| 2,326,558 | * | 8/1943 | Pelz ........................................ 24/3.11 |
| 4,181,859 | * | 1/1980 | Vitalini ................................. 250/476 |
| 4,605,335 | * | 8/1986 | Otrusina ................................ 24/3.12 |
| 4,744,487 | | 5/1988 | Welborn . |
| 4,881,150 | * | 11/1989 | Oyamada ............................... 24/3.11 |
| 4,956,895 | * | 9/1990 | Hayasaka .............................. 24/3.11 |
| 5,016,326 | | 5/1991 | Goldenberg . |
| 5,081,709 | | 1/1992 | Benyo et al. . |
| 5,452,497 | * | 9/1995 | Peng ...................................... 24/3.11 |
| 5,806,146 | * | 9/1998 | Chen ..................................... 24/3.11 |
| 5,829,102 | * | 11/1998 | Conti ..................................... 24/3.11 |

FOREIGN PATENT DOCUMENTS

WO9908562  2/1999  (WO) .

OTHER PUBLICATIONS

Chan H B et al. "Pager Belt Clip", Motorola Technical Developments, vol. 12, Apr. 1, 1991, pp. 1–2, Xp000226121.

* cited by examiner

Primary Examiner—Victor N. Sakran
(74) Attorney, Agent, or Firm—Burns, Doane, Swecker & Mathis, L.L.P.

(57) ABSTRACT

Clamping assembly, comprising a base part, a clamping part, a pivot pin and spring means. The base part and the clamping part have projections with passages. In the assembled state, the passages lie in line with one another and hold the pin in place. The passages of one part are formed by a recess which extends from a side of the part which does not have the projections to the side of the part which does have the projections.

14 Claims, 1 Drawing Sheet

CLAMPING ASSEMBLY

CROSS-REFERENCE TO RELATED APPLICATIONS

This application is a continuation application of International Application No. PCT/NL98/00423, filed Jul. 23, 1998, which designates the United States

FIELD OF THE INVENTION

The invention relates to a clamping assembly, comprising a base part, a clamping part, a pivot pin and spring means, the base part and the clamping part having projections on sides which lie opposite one another, which projections have passages which are aligned with one another and are suitable for receiving and retaining the pivot pin, and the spring means being suitable for pushing one end of the clamping part against the base part.

The invention relates in particular to a clamping assembly of this kind for attaching an electronic unit, such as a radio pager, to an item of clothing.

BACKGROUND OF THE INVENTION

A clamping assembly consisting of cast material is known in practice. In the known clamping assembly, the passages in both the base part and the clamping part are round openings, i.e. they have a continuous cylindrical wall.

The known clamping assembly has the drawback that a mould for casting the parts requires an axially displaceable pin for each of the openings for the pivot pin. As a result, the mould is relatively complicated and expensive, while the use of the displaceable pin requires additional operations, time and/or energy in order to pull the pin out of the cast material when the material has sufficiently solidified. This considerably increases the cost price of the clamping assembly.

Furthermore, the accuracy of the position and of the dimensions of the passages is dependent on the time and speed at which the pin is pulled out of the cast material. The more quickly the pin is pulled out, the more damaging this will be to the accuracy.

SUMMARY OF THE INVENTION

The object of the invention is to eliminate the above drawbacks.

The clamping assembly of the type mentioned in the preamble is therefore characterized, according to the invention, in that the passage of each projection of one part is formed by a recess which extends from a side of the part which does not have the projections to the side of the part which does have the projections.

As a result, when casting the part with the passages formed by recesses, it is possible to use a simple mould without movable shaping members, with the result that the part can be cast quickly, accurately and inexpensively.

The clamping assembly is preferably characterized in that a passage, which is formed by a recess, has a height from a side of the part which has the projections to a base of the recess which is greater than the diameter of the pivot pin.

As a result, the parts can move towards one another, counter to the action of the spring means, so that a shock-absorbing property is obtained. Furthermore, since the pivot pin has to be pushed through passages whose dimensions are greater than the diameter of the pin, the clamping assembly can be assembled more easily and more quickly.

Preferably, the clamping assembly is moreover characterized in that a dimension of the passage decreases towards the base of the recess, as seen perpendicular to the pivot pin. As a result, the parts moreover have the freedom to rotate slightly with respect to one another, counter to the action of the spring means, about an axis which is perpendicular to the pivot pin. As a result, a further shock-absorbing property is obtained.

BRIEF DESCRIPTION OF THE DRAWINGS

The invention will be explained below with reference to the appended drawings, in which.

DESCRIPTION OF THE PREFERRED EMBODIMENT

Figure 1:
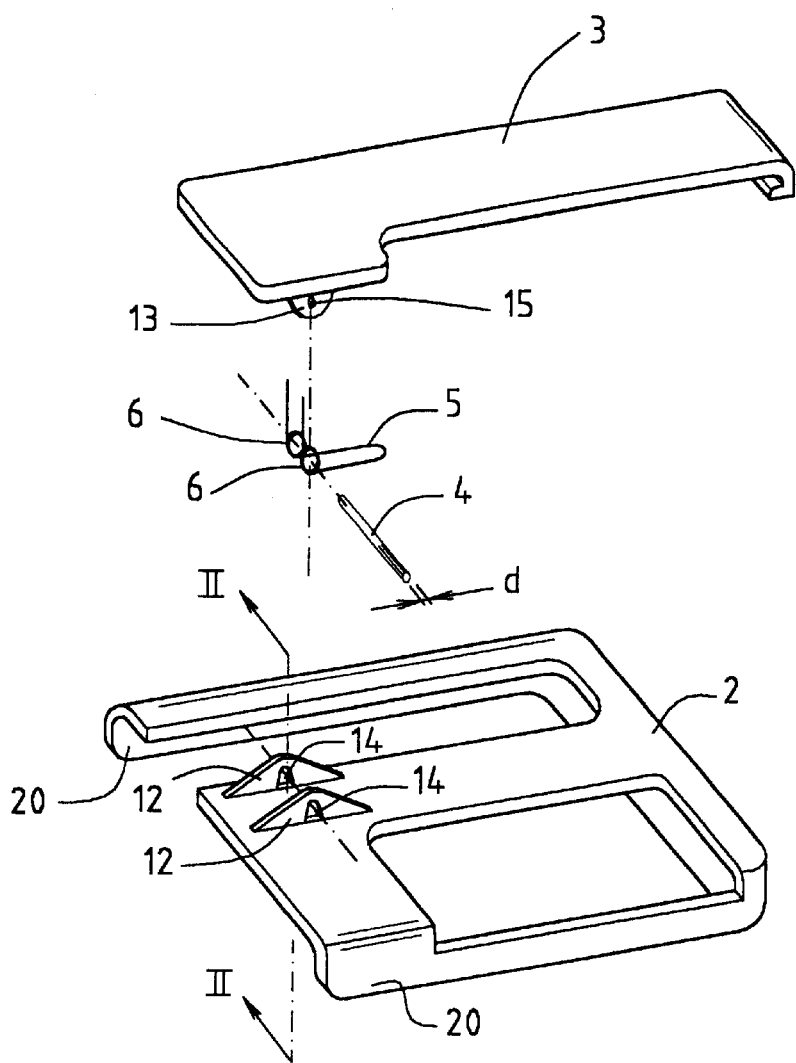
FIG. 1 shows a perspective, exploded view of an embodiment of the clamping assembly according to the invention.

The clamping assembly according to the invention shown in FIG. 1 comprises a base part 2, a clamping part 3, a pivot pin 4 and spring means 5. The spring means 5 comprise two coil springs, which are connected via their ends, and round openings 6 in which are suitable for allowing the pivot pin 4 to pass through.

On mutually facing sides, the base part 2 and the clamping part 3 have projections 12 and 13, respectively, which are arranged at distances from one another which are such that after the clamping assembly has been put together they fit between one another.

The projections 12, 13 have passages 14 and 15, respectively, which after the clamping assembly has been put together lie in line with one another and with the openings 6 of the spring means 5 and the pin 4.

The passages 15 are suitable for holding the pin 4 in place in the assembled state of the clamping assembly (not shown).

Figure 2:
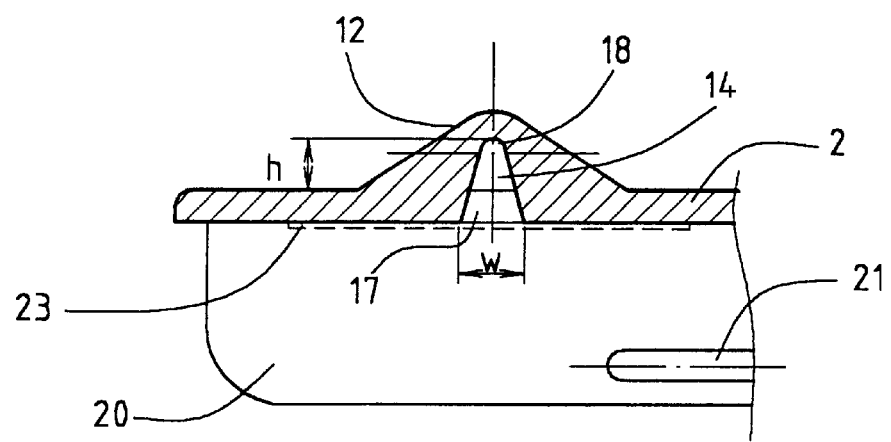
FIG. 2 shows a cross-section, on line II—II, through a section of the base part shown in FIG. 1.

As shown in FIG. 2, a passage 14 comprises a recess 17 which extends from a side of the base part 2 which does not have the projections 12 to a side of the base part 2 which does have the projections 12. Since the passages 14 do not have a continuous, closed internal wall, the base part 2 can be cast using a simple mould without movable components for forming the passages 14.

As shown, the passage 14 preferably has a height h between its base 18 and that side of the base part 2 from which the projection 12 starts which is greater than the diameter d of the pivot pin 4. As a result, in the assembled state the base part 2 and the clamping part 3 can move towards one another, counter to the action of the spring means 5, through the difference in dimensions h–d, thus counteracting damage to the pivoting coupling, for example in the event of impacts, while moreover components which are attached directly or indirectly to the base part 2, in particular electronic components (not shown), are protected from impacts.

As is also shown in FIG. 2, a dimension w measured perpendicular to the pivot pin decreases from the recess 17 towards the base 18 of the recess 17. As a result, the parts 3, 4 can moreover rotate through a small angle with respect to one another about an axis which is perpendicular to the pivot pin. As a result, the shock-absorbing properties of the assembly are improved.

The invention is explained above on the basis of a base part 2 which may, in particular, be a holster for an electronic unit, in particular a radio pager. A housing (not shown) for the electronic unit can in this case be pushed with a slight clearance between flanges 20 of the base part 2, which flanges extend opposite one another, in which case ribs 21 which are arranged on opposite sides of the flanges 20 can be received in recesses in the housing for the purpose of holding the housing in the base part 2. As an alternative, the said housing itself may according to the invention be provided with projections 12 of the type explained above. In order to protect the electronic components inside the housing, the recesses may then be covered, for example by means of a self-adhesive film/foil 23, as shown diagrammatically in FIG. 2.

What is claimed is:

1. Clamping assembly, comprising a base part, a clamping part, a pivot pin and spring means, the base part and the clamping part having projections on sides which lie opposite one another, which projections have passages which are aligned with one another and are suitable for receiving and retaining the pivot pin, and the spring means being suitable for pushing one end of the clamping part against the base part, wherein the passage of each projection of one part is formed by a recess which extends from a side of the part which does not have the projections to the side of the part which does have the projections.

2. Clamping assembly according to claim 1, wherein a passage, which is formed by a recess, has a height from a side of the part which has the projections to a base of the recess which is greater than the diameter of the pivot pin.

3. Clamping assembly according to claim 1, wherein a passage, which is formed by a recess, has a height from a side of the part which has the projections to a base of the recess which is greater than the diameter of the pivot pin and a dimension of the passage decreases towards the base of the recess, as seen perpendicular to the pivot pin.

4. Clamping assembly according to claim 1, comprising a cover member which is suitable for covering the recess on the side of the part from which the recess begins.

5. Clamping assembly according to claim 4, wherein the cover member is a piece of self-adhesive film/foil.

6. Clamping assembly according to claim 1, wherein the part with the passages formed by the recesses is a housing for a portable electronic unit.

7. Clamping assembly according to claim 1, wherein the part with the passages formed by the recesses is a holster for a housing for a portable electronic unit.

8. A clamping assembly comprising:

a base having first projections on a first surface thereof, the first projections having first passages;

a clamping member having second projections on one surface thereof which are adapted to engage with the first projections, the second projections having second passages which are aligned with the first passages when the second projections are engaged with the first projections;

a pivot pin adapted to be received and retained in the first and second passages to connect the base and the clamping member;

a spring adapted to bias one end of the clamping member against the base;

wherein the first passages are each formed by a recess which extends from a second surface of the base opposed to the first surface, which second surface does not have the first projections, towards the first surface of the base which does have the first projections.

9. The clamping assembly according to claim 8, the first passages each have a height from the first surface of the base which has the projections to a base of the recess which is greater than the diameter of the pivot pin.

10. The clamping assembly according to claim 8, wherein the first passages each have a height from the first surface of the base which has the projections to a base of the recess which is greater than the diameter of the pivot pin and a dimension of the passage perpendicular to the pivot pin decreases towards the base of the recess.

11. The clamping assembly according to claim 8, further comprising:

a cover member adapted to cover the recess on the surface of the base from which the recess begins.

12. The clamping assembly according to claim 11, wherein the cover member is a piece of self-adhesive film or foil.

13. The clamping assembly according to claim 8, wherein the base is a housing for a portable electronic unit.

14. The clamping assembly according to claim 8, wherein the base is a holster for a housing for a portable electronic unit.

* * * * *